(12) United States Patent
Yang

(10) Patent No.: US 7,985,157 B2
(45) Date of Patent: Jul. 26, 2011

(54) DECELERATING DEVICE AND PROJECTION SCREEN ROLLING MECHANISM

(75) Inventor: Xin-Chang Yang, Suzhou Industrial Park (CN)

(73) Assignee: Coretronic (Suchou) Corporation, Suzhou (CN)

( * ) Notice: Subject to any disclaimer, the term of this patent is extended or adjusted under 35 U.S.C. 154(b) by 385 days.

(21) Appl. No.: 12/264,320

(22) Filed: Nov. 4, 2008

(65) Prior Publication Data

US 2009/0318258 A1 Dec. 24, 2009

(30) Foreign Application Priority Data

Jun. 24, 2008 (TW) .............................. 97123472 A

(51) Int. Cl.
*F16H 3/74* (2006.01)
*G03B 21/56* (2006.01)
(52) U.S. Cl. ........................................ 475/260; 359/461
(58) Field of Classification Search .................. 475/260; 359/461
See application file for complete search history.

(56) References Cited

U.S. PATENT DOCUMENTS

| 5,099,906 | A * | 3/1992 | Chigusa et al. | 160/297 |
| 7,706,067 | B2 * | 4/2010 | Liang | 359/461 |
| 2002/0048083 | A1 * | 4/2002 | Okumura | 359/461 |
| 2008/0032849 | A1 * | 2/2008 | Briscoe | 475/331 |

* cited by examiner

*Primary Examiner* — Edwin A. Young
(74) *Attorney, Agent, or Firm* — Chun-Ming Shih

(57) ABSTRACT

A decelerating device includes a fixed shaft, a tube, a transmission element and a driven element is provided. The tube is disposed around the fixed shaft and adapted to rotate about the fixed shaft. The transmission element has a fixed portion fixed at the fixed shaft and a planetary gear revolvably disposed at the fixed portion. The teeth of the tube are geared to the planetary gear. The driven element has a wheel, a sun gear fixed at the wheel and a plurality of balls. The sun gear and the wheel are revolvably disposed at the fixed shaft and in the tube. The planetary gear is adapted to drive the sun gear. The wheel has holes. Each of the holes extends from an outer surface of the wheel facing the tube to the interior of the wheel to form a cavity. The balls are disposed in the holes respectively.

16 Claims, 13 Drawing Sheets

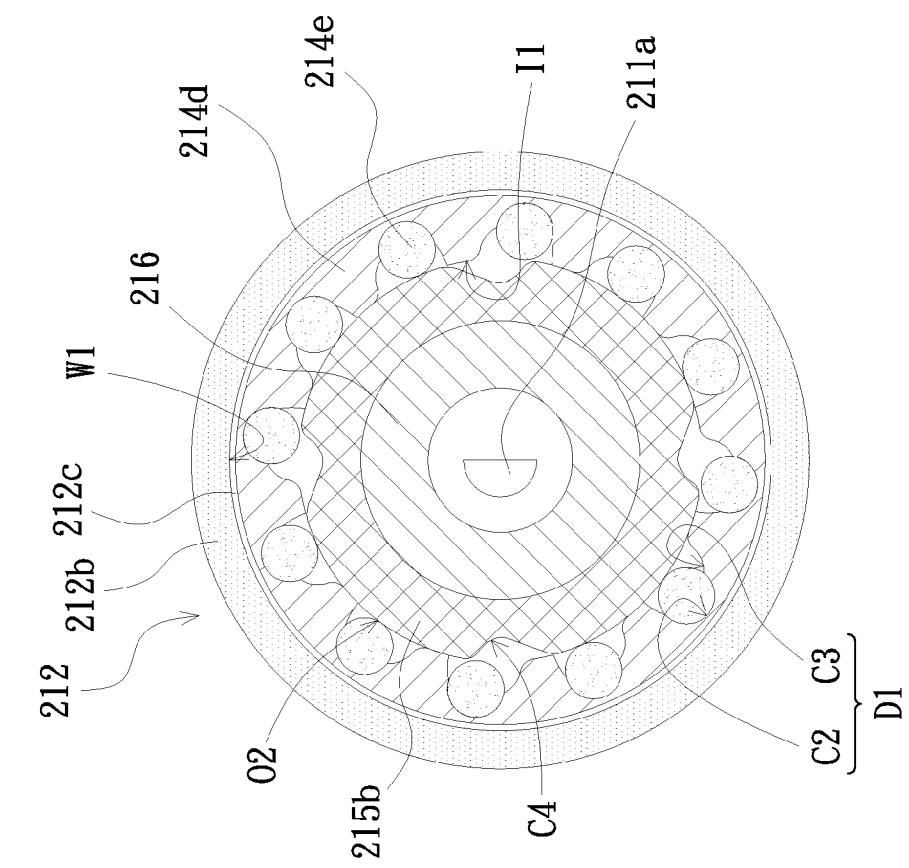
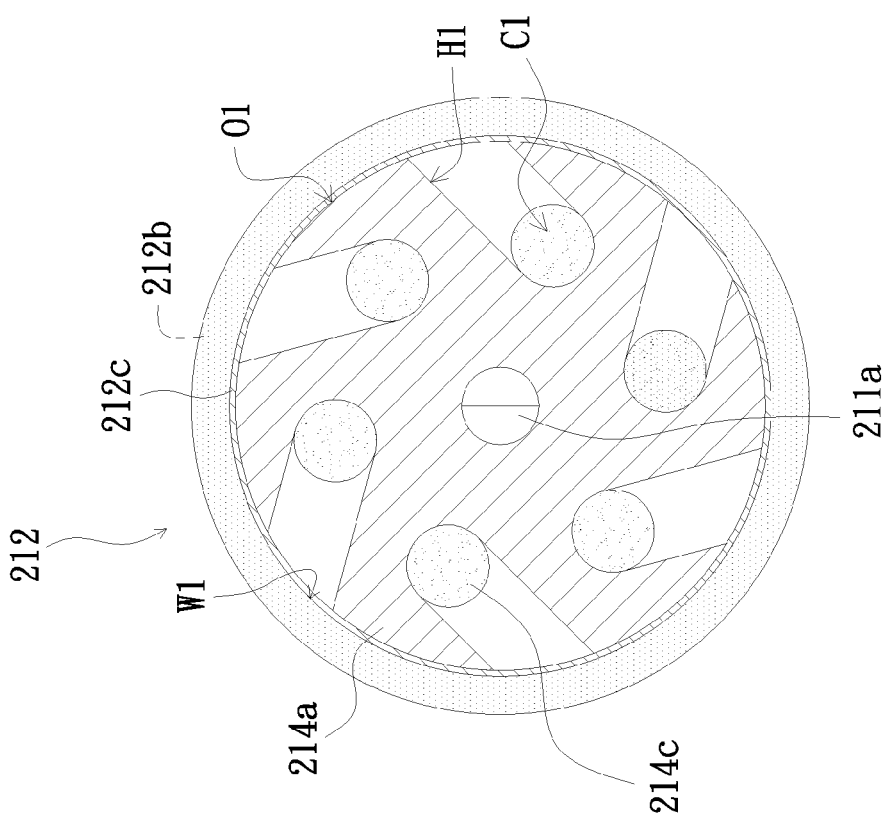
FIG. 3B
FIG. 3A

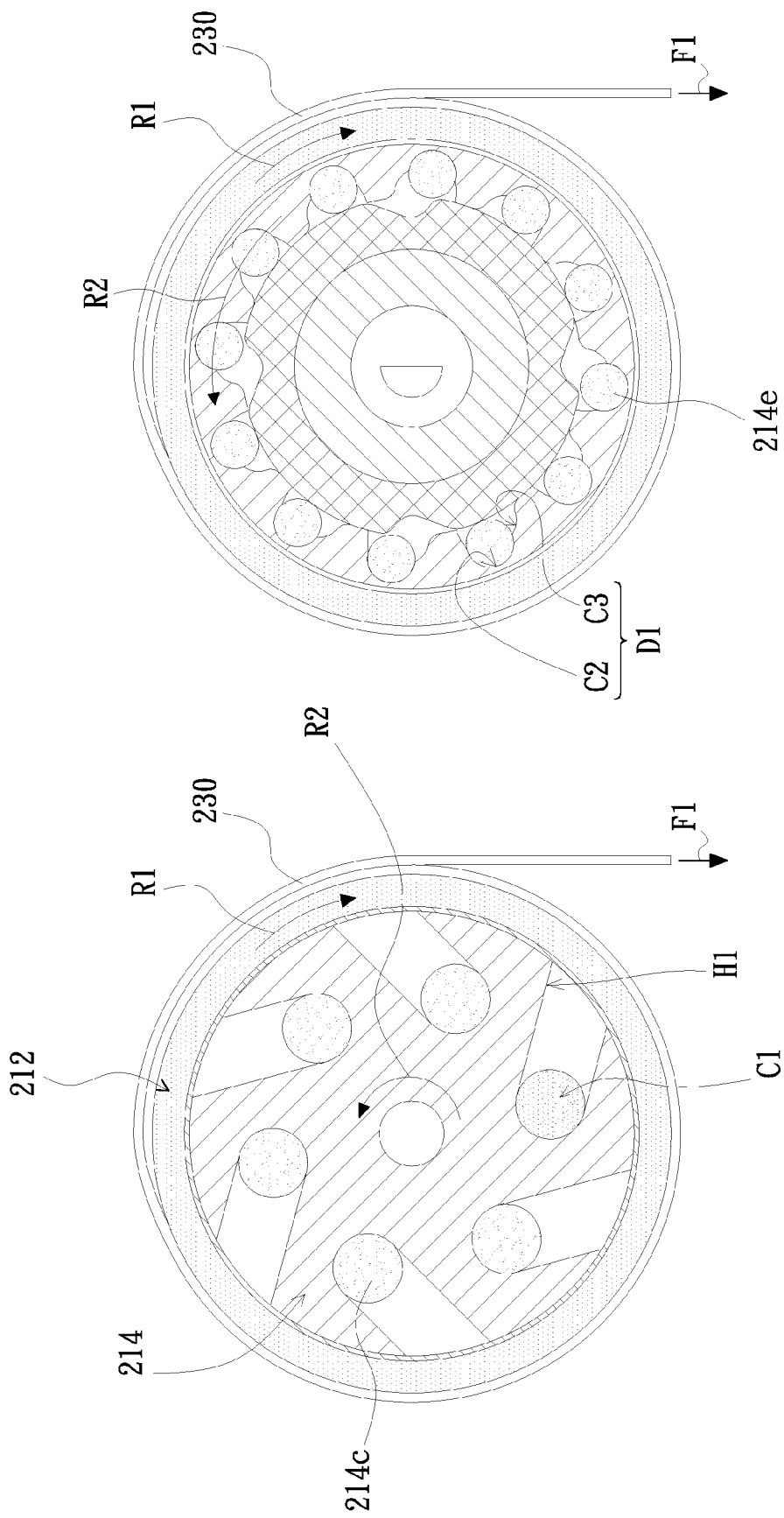

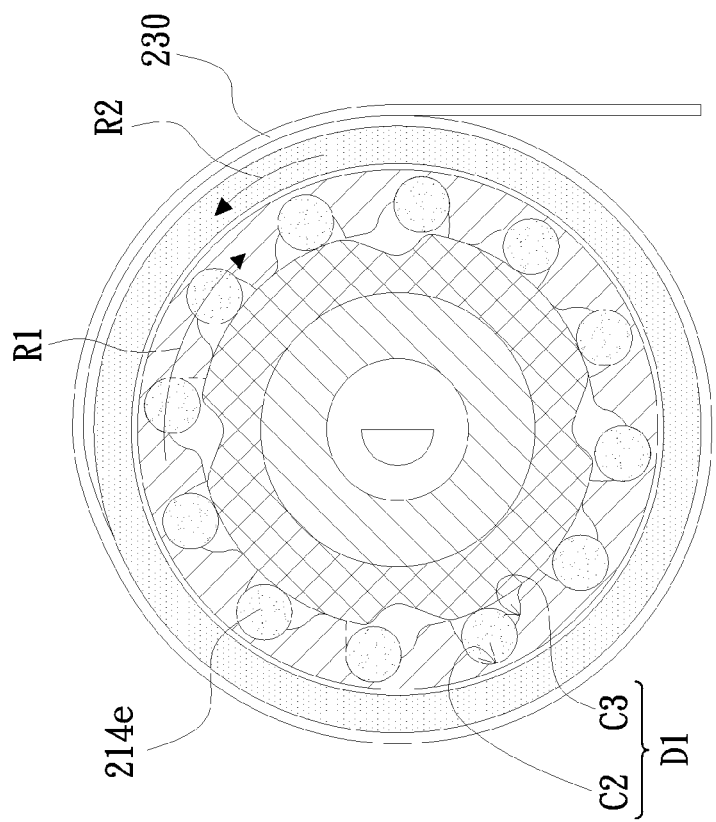
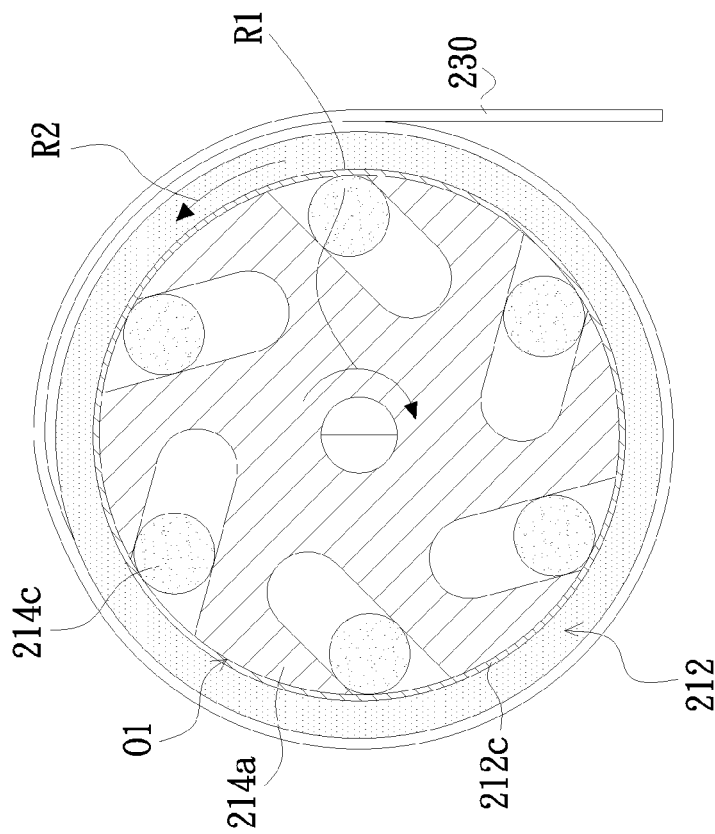
FIG. 5A
FIG. 5B

DECELERATING DEVICE AND PROJECTION SCREEN ROLLING MECHANISM

BACKGROUND

1. Field of the Invention

The present invention relates to a decelerating device. More particularly, the present invention relates to a projection screen rolling mechanism comprising the decelerating device.

2. Detailed Description of the Related Art

A present optical projector, such as a single beam projector and an LCD projector, may project images with high definition and high brightness. In addition, the optical projector has the advantages of lower price which is similar to that of the conventional TV sets, small volume, and easy to carry. Accordingly, the optical projector is increasingly accepted by most people in the society.

On a large occasion for speech, the optical projector projects images on a projection screen such that the audience looks at the information on the projection screen easily. In the conventional art, the projection screen and a rolling unit together compose a projection screen rolling mechanism. One side of the projection screen is connected to a rotation shaft of the rolling unit and the projection screen rolls around the rotation shaft such that another side of the projection screen is exposed. When a user wants to use the projection screen, the user pulls the exposed side of the projection screen such that the projection screen extends gradually and a torsional spring of the rolling unit connected to the rotation shaft deforms elastically. Next, the user fixes the exposed side of the projection screen such that the optical projector can project images on the projection screen.

When the user wants to roll up the projection screen, the user frees the projection screen and the recovering force of the torsional spring drives the rotation shaft to rotate such that the projection screen rolls. However, in the conventional art, the rotational speed of rotation shaft is very fast such that the projection screen is easily damaged.

BRIEF SUMMARY

The present invention is directed to provide a decelerating device having the function of decelerating.

The present invention is directed to provide a projection screen rolling mechanism which includes the decelerating device having the function of decelerating.

Other advantages and objects of the present invention may be further comprehended through the technical features disclosed in the present invention.

In order to achieve one or part of or all the objectives or other objectives, in an embodiment of the present invention, a decelerating device includes a fixed shaft, a tube, a first transmission element and a driven element. The tube is disposed around the fixed shaft and adapted to rotate about the fixed shaft. The tube has a plurality of internal teeth. The first transmission element has a fixed portion fixed at the fixed shaft and at least one first planetary gear revolvably disposed at the fixed portion. The internal teeth of the tube are geared to the first planetary gear.

The driven element has a wheel, a first sun gear fixed at the wheel and a plurality of first balls. The first sun gear and the wheel are revolvably disposed at the fixed shaft and in the tube. The first planetary gear is adapted to drive the first sun gear. The wheel has a plurality of holes. Each of the holes extends from an outer surface of the wheel facing the tube to the interior of the wheel to form a first cavity. The first balls are disposed in the holes respectively.

When the tube rotates along a first rotational direction, the driven element rotates along a second rotational direction opposite to the first rotational direction and each of the first balls is located in the corresponding first cavity. When the tube rotates above a specific rotational speed along the second rotational direction, the driven element rotates along the first rotational direction and each of the first balls is exposed outside the outer surface of the wheel and rubs against the tube.

In order to achieve one or part of or all the objectives or other objectives, in an embodiment of the present invention, a projection screen rolling mechanism includes the decelerating device, a torsional spring and a projection screen. The torsional spring is hitched to the fixed shaft. One end of the torsional spring is connected to the tube and another end of the torsional spring is connected to the fixed shaft. One side of the projection screen is connected to the tube and the projection screen is adapted to roll around the fixed shaft. When the projection screen is pulled such that the tube rotates along a first rotational direction, the torsional spring deforms elastically, the driven element rotates along a second rotational direction opposite to the first rotational direction and each of the first balls is located in the corresponding first cavity. When the tube affected by the recovering force of the torsional spring rotates above a specific rotational speed along the second rotational direction, the projection screen rolls around the fixed shaft, the driven element rotates along the first rotational direction and each of the first balls is exposed outside the outer surface of the wheel and rubs against the tube.

In view of the mentioned above, when the tube rotates above the specific rotational speed along the second rotational direction, each of the first balls affected by a centrifugal force is exposed outside the outer surface of the wheel and rubs against the tube to decelerate the tube. Accordingly, the projection screen of the projection screen rolling mechanism including the decelerating device in the present embodiment is not damaged in the rolling process.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the embodiments of the invention, and are incorporated in and constitute part of this specification. The drawings illustrate embodiments of the invention and, together with the description, serve to explain the principles of the invention.

FIG. 3A is a schematic cross-sectional view of the decelerating device in FIG. 2A along the line I-I.

FIG. 3B is a schematic cross-sectional view of the decelerating device in FIG. 2A along the line II-II.

FIG. 4A is a schematic cross-sectional view of the projection screen in the first embodiment which is pulled to drive the decelerating device.

FIG. 4B is another schematic cross-sectional view of the projection screen in the first embodiment which is pulled to drive the decelerating device.

FIG. 5A is a schematic cross-sectional view of the projection screen in the first embodiment which is rolled up.

FIG. 5B is another schematic cross-sectional view of the projection screen in the first embodiment which is rolled up.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1:
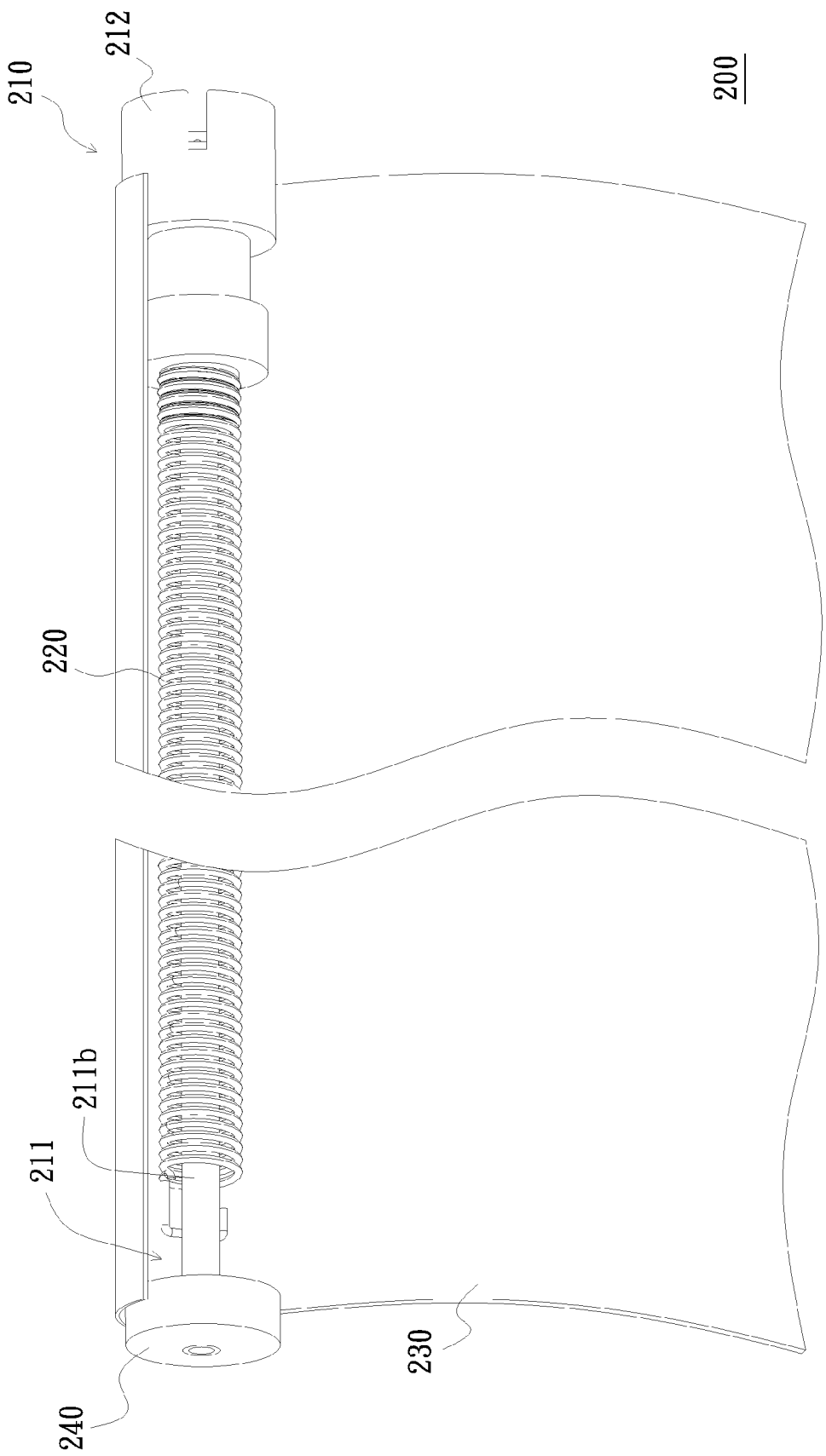
FIG. 1 is a schematic view of a projection screen rolling mechanism in the first embodiment of the present invention.
Figure 2A:
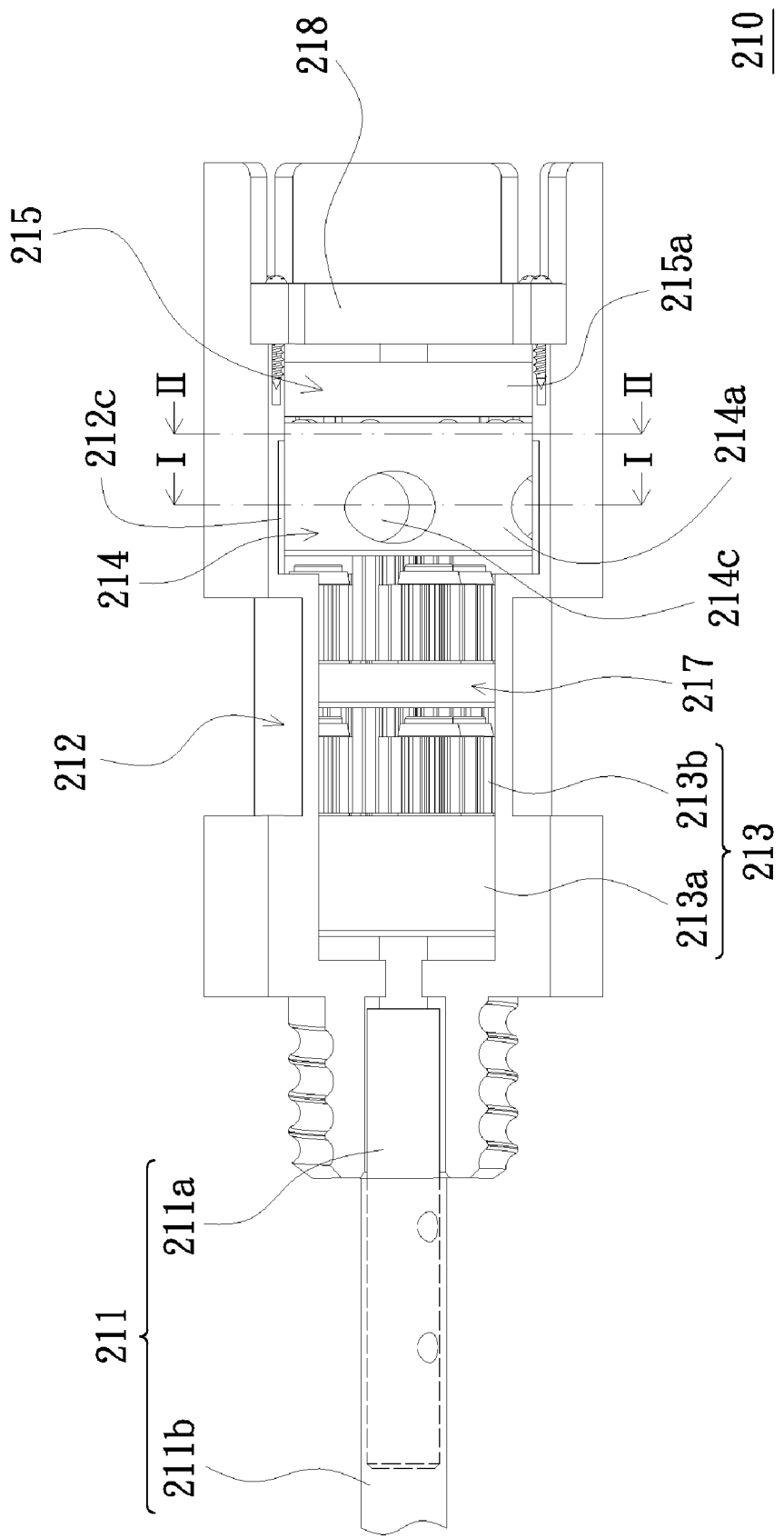
FIG. 2A is a schematic view of the decelerating device in FIG. 1.
Figure 2B:
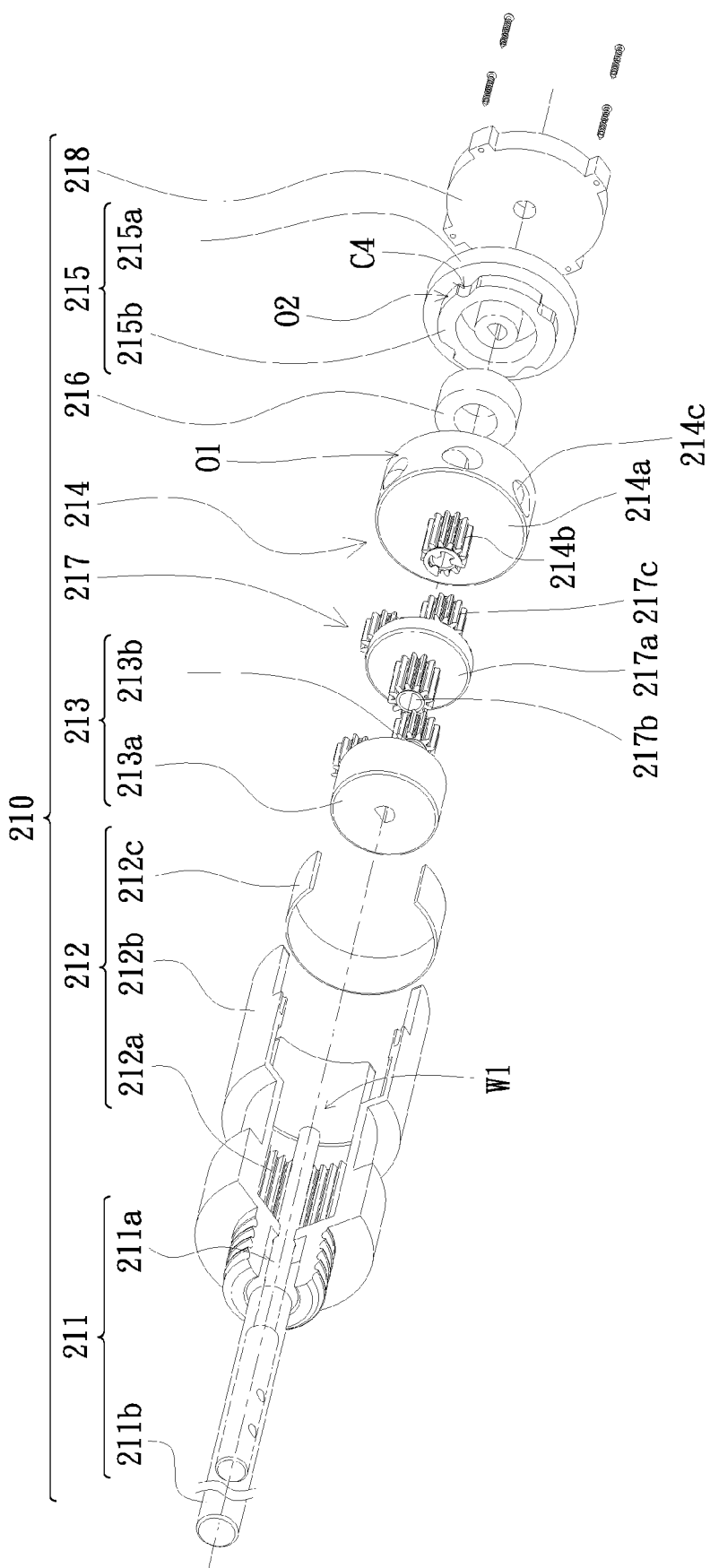
FIG. 2B is a schematic exploded view of the decelerating device in FIG. 2A.
Figure 2C:
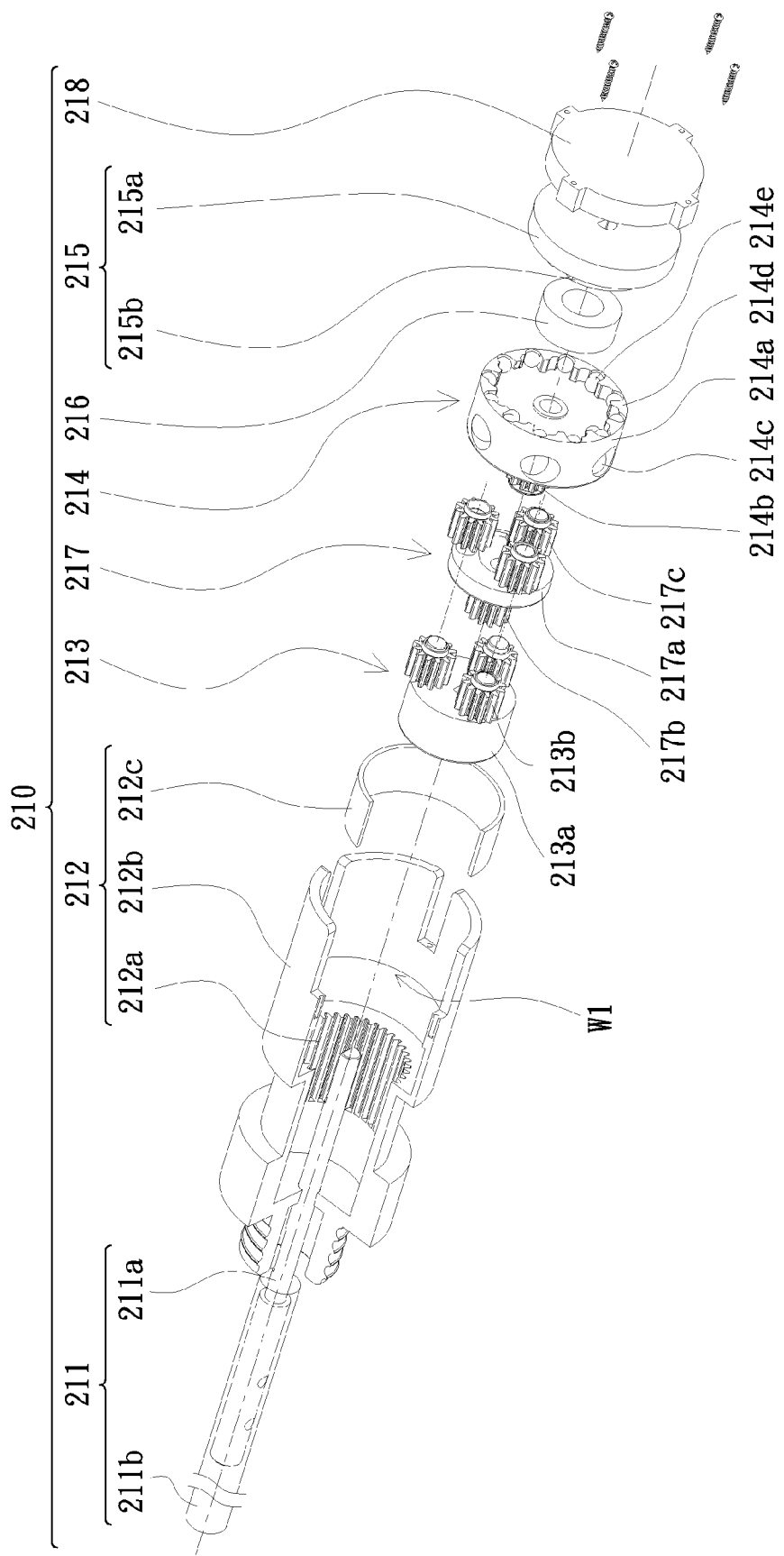
FIG. 2C is another schematic exploded view of the decelerating device in FIG. 2A.

FIG. 1 is a schematic view of a projection screen rolling mechanism in the first embodiment of the present invention. FIG. 2A is a schematic view of the decelerating device in FIG. 1. FIG. 2B is a schematic exploded view of the decelerating device in FIG. 2A. FIG. 2C is another schematic exploded view of the decelerating device in FIG. 2A. FIG. 3A is a schematic cross-sectional view of the decelerating device in FIG. 2A along the line I-I. FIG. 3B is a schematic cross-sectional view of the decelerating device in FIG. 2A along the line II-II. It should be noted that a cutaway view of the tube (see the following description) is illustrated in FIGS. 2A, 2B and 2C for convenient illustration.

Please referring to FIGS. 1 and 2A, a projection screen rolling mechanism 200 in the present embodiment includes a decelerating device 210, a torsional spring 220, a projection screen 230 and an auxiliary rotation wheel 240. The decelerating device 210 includes a fixed shaft 211, a tube 212, a first transmission element 213, a driven element 214, a fixed element 215, a magnetic element 216, a second transmission element 217 and a shield 218. The torsional spring 220 is hitched to the fixed shaft 211. One end of the torsional spring 220 is connected to the tube 212 and another end of the torsional spring 220 is connected to the fixed shaft 211. One side of the projection screen 230 is connected to the tube 212 and the auxiliary rotation wheel 240. The projection screen 230 is adapted to roll around the fixed shaft 211.

Please referring FIGS. 2A, 2B and 2C, in the present embodiment, the fixed shaft 211 of the decelerating device 210 includes a fixed axle 211a and a fixed pipe 211b. The fixed axle 211a passes through the tube 212, the first transmission element 213, the driven element 214, the fixed element 215, the magnetic element 216 and the second transmission element 217 to be assembled to the shield 218. The fixed pipe 211b is immovably hitched to the fixed axle 211a. The torsional spring 220 (see FIG. 1) is hitched to the fixed pipe 211b. The end of the torsional spring 220 connected to the fixed shaft 211 is connected to the fixed pipe 211b.

The tube 212 of the decelerating device 210 is disposed around the fixed axle 211a of the fixed shaft 211 and adapted to rotate about the fixed shaft 211. The tube 212 has a plurality of internal teeth 212a, a casing 212b and a sound-attenuating ring 212c. The internal teeth 212a are located at an inner wall W1 of the casing 212b. The sound-attenuating ring 212c is disposed on the inner wall W1. In addition, the sound-attenuating ring 212c is composed of rubber.

The first transmission element 213 has a fixed portion 213a and at least one first planetary gear 213b revolvably disposed at the fixed portion 213a (three first planetary gears are schematically shown in FIG. 2C). The internal teeth 212a of the tube 212 are geared to the first planetary gears 213b. The fixed portion 213a of the first transmission element 213 is fixed at the fixed axle 211a of the fixed shaft 211.

The second transmission element 217 disposed between the first transmission element 213 and the driven element 214 has a base 217a, a second sun gear 217b fixed at the base 217a and at least one second planetary gear revolvably disposed at the base 217a (three second planetary gears are schematically shown in FIG. 2C). The second sun gear 217b and the group of the second planetary gears 217c are disposed at two opposite sides of the base 217a respectively. The second sun gear 217b and the base 217a are revolvably disposed at the fixed axle 211a of the fixed shaft 211. The first planetary gears 213b of the first transmission element 213 are geared to the second sun gear 217b of the second transmission element 217.

Please referring to FIGS. 2A, 2B, 2C, 3A and 3B, the driven element 214 has a wheel 214a, a first sun gear 214b fixed at the wheel 214a and a plurality of first balls 214c. The first sun gear 214b and the wheel 214a are revolvably disposed at the fixed axle 211a of the fixed shaft 211 and in the casing 212b of the tube 212. The wheel 214a has a plurality of holes H1 and an outer surface O1. The outer surface O1 faces the inner wall W1 of the casing 212b of the tube 212. Each of the holes H1 extends from the outer surface O1 of the wheel 214a to the interior of the wheel 214a to form a first cavity C1. The first balls 214c are disposed in the holes H1 respectively. The sound-attenuating ring 212c of the tube 212 surrounds the outer surface O1 of the wheel 214a. In addition, the second planetary gears 217c of the second transmission element 217 are geared to the first sun gear 214b of the driven element 214. To sum up, the first planetary gears 213b of the first transmission element 213 are adapted to drive the first sun gear 214b of the driven element 214 through the second transmission element 217.

The driven element 214 further has an outer ring 214d disposed at the wheel 214a and a plurality of second balls 214e. The outer ring 214d has a plurality of dents D1. Each of the dents D1 is located at an inner surface I1 of the outer ring 214d. Each of the dents D1 has a second cavity C2 and a third cavity C3. The second balls 214e are disposed at the dents D1 respectively.

The fixed element 215 is fixed at the fixed axle 211a of the fixed shaft 211. The fixed element 215 has a base 215a and an inner ring 215b disposed at the base 215a. The base 215a is near the outer ring 214d of the driven element 214. The inner ring 215b is located in the outer ring 214d and has at least one fourth cavity C4 (four fourth cavities C4 is schematically shown in FIG. 3B). The fourth cavities C4 are located at an outer surface O2 of the inner ring 215b. The outer surface O2 faces the inner surface T1 of the outer ring 214d and the inner wall W1 of the casing 212b of the tube 212. In addition, the magnetic element 216 is disposed in the inner ring 215b. The shield 218 are revolvably disposed at the fixed axle 211a of the fixed shaft 211 and fixed to the casing 212b of the tube 212.

Figure 6:
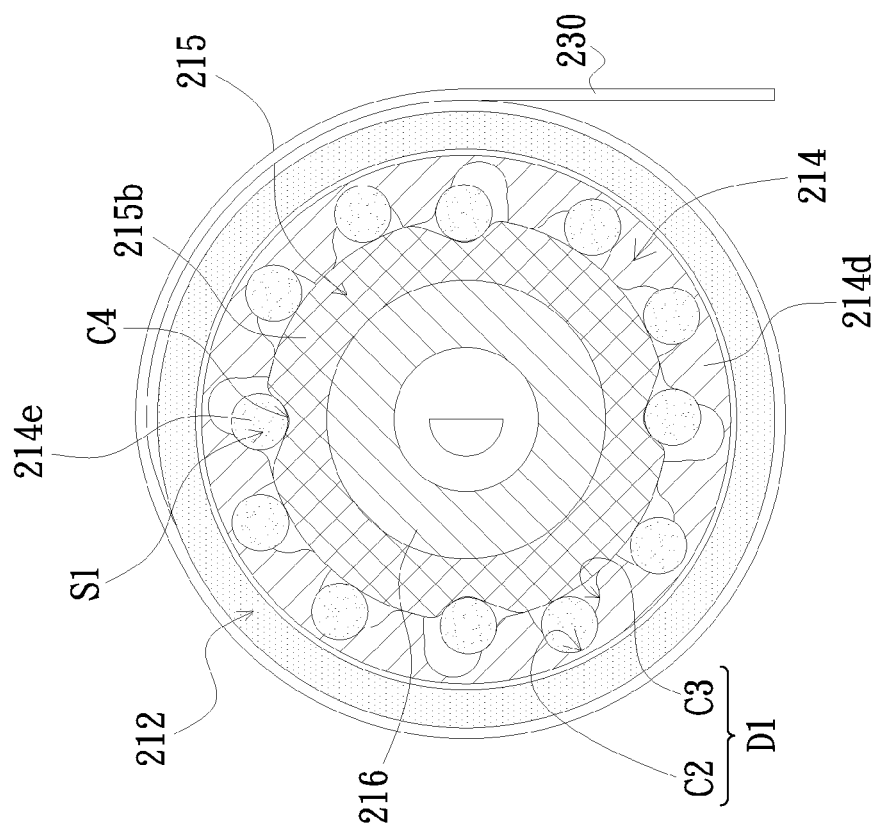
FIG. 6 is a schematic cross-sectional view of the decelerating device in the first embodiment which is self-locking.

The operation process of the projection screen rolling mechanism 200 in the present embodiment is described below. FIG. 4A is a schematic cross-sectional view of the projection screen in the present embodiment which is pulled to drive the decelerating device. FIG. 4B is another schematic cross-sectional view of the projection screen in the present embodiment which is pulled to drive the decelerating device. FIG. 5A is a schematic cross-sectional view of the projection screen in the present embodiment which is rolled up. FIG. 5B is another schematic cross-sectional view of the projection screen in the present embodiment which is rolled up. FIG. 6 is a schematic cross-sectional view of the decelerating device in the present embodiment which is self-locking.

Please referring to FIGS. 4A and 4B, when the projection screen 230 is affected by an external force F1 to be pulled such that the tube 212 rotates along a first rotational direction R1, the torsional spring 220 (see FIG. 1) deforms elastically, the driven element 214 rotates along a second rotational direction R2 opposite to the first rotational direction R1 and each of the first balls 214c is located in the first cavity C1 of the corresponding hole H1. At this time, each of the second balls 214e affected by a centrifugal force is located at the second cavity C2 of the corresponding dent D1.

Please referring to FIGS. 5A and 5B, when the tube 212 affected by the recovering force of the torsional spring 220 (see FIG. 1) rotates above a specific rotational speed along the second rotational direction R2, the projection screen 230 rolls around the fixed pipe 211b of the fixed shaft 211 (see FIG. 1), the driven element 214 rotates along the first rotational direction R1 and each of the first balls 214c affected by another centrifugal force is exposed outside the outer surface O1 of the wheel 214a and rubs against the sound-attenuating ring 212c of the tube 212 such that the rotational speed of the tube 212 is reduced and the noise generated is lower. At this time, each of the second balls 214e affected by another centrifugal force is located at the second cavity C2 of the corresponding dent D1. Accordingly, the projection screen 230 is not damaged in the rolling process of projection screen rolling mechanism 200.

Please referring to FIG. 6, when one of the fourth cavities C4 of the inner ring 215b of the fixed element 215 and the third cavity C3 of one of the dents D1 of the outer ring 214d of the driven element 214 together form an accommodating space S1 and at least one of the second balls 214e is located at the accommodating space S1, the second ball 214e at the accommodating space S1 restricts the rotation of the driven element 214 along the first rotational direction R1 (see FIG. 5B). In other words, when the projection screen 230 is not pulled or not rolled up to be brought to a stop, the tube 212 stops rotating and one of the second balls 214e may be affected by the magnetic force of the magnetic element 216 to be located at the accommodating space S1 such that the decelerating device 210 (see FIG. 2A) is self-locking. Accordingly, the user may stop the projection screen 230 from moving so as to locate the projection screen 230 at an adequate position.

It should be noted that a designer may remove the magnetic element 216. The self-locking of the decelerating device 210 may be achieved because one of the second balls 214e affected by the gravity is located at the accommodating space S1.

If the user want to relieve the self-locking of the decelerating device 210, the user pulls the projection screen 230 to move the second ball 214e located at the accommodating space S1. Next, the projection screen 230 may be pulled by the user to be located at another position such that the self-locking of the decelerating device 210 is achieved again or that the projection screen 230 is loosed to be rolled up.

Figure 7:
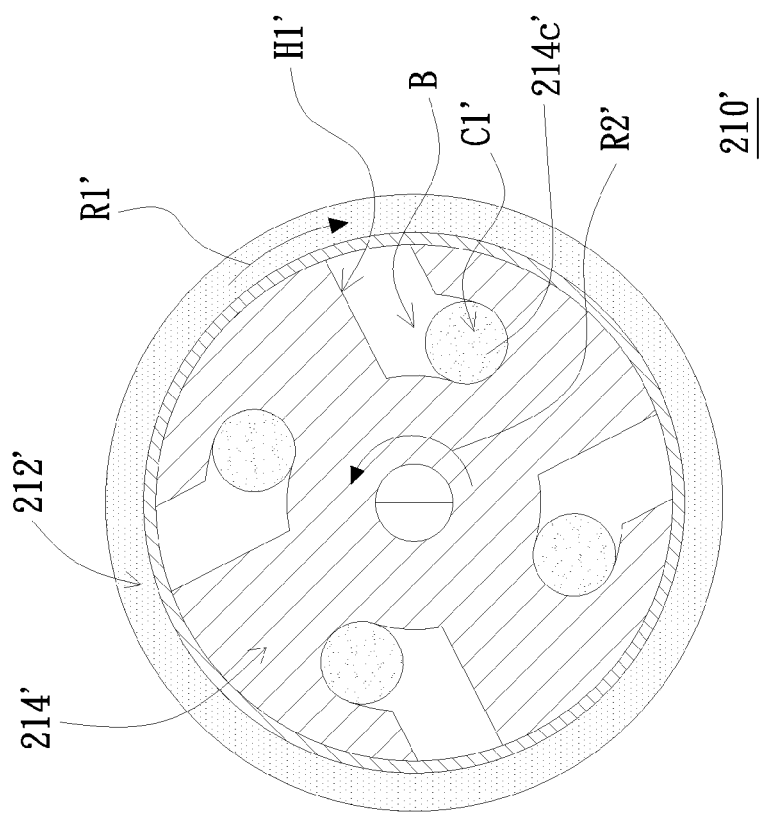
FIG. 7 is a schematic cross-sectional view of another decelerating device in the first embodiment of the present invention.

FIG. 7 is a schematic cross-sectional view of another decelerating device in the first embodiment of the present invention. Please referring to FIG. 7, the difference between the decelerating device 210' and the decelerating device 210 lies in that the shape of each of the holes H1' is different form that of each of the holes H1. Each of the holes H1' has a bent portion B such that each of the first balls 214c' is more stably located in the first cavity C1' of the corresponding hole H1' when the tube 212' rotates along the first rotational direction R1' and the driven element 214' rotates along the second rotational direction R2' opposite to the first rotational direction R1'.

Second Embodiment

Figure 8A:
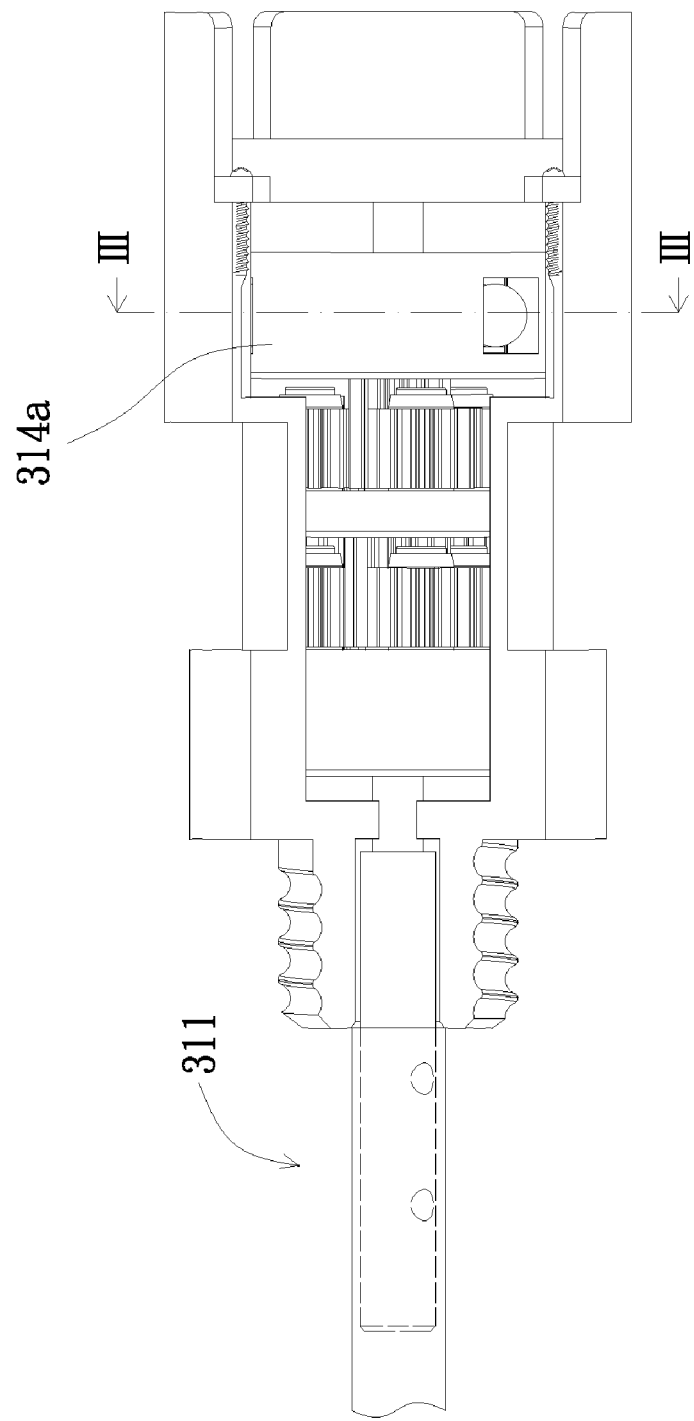
FIG. 8A is a schematic view of the decelerating device in the second embodiment of the present invention.
Figure 8B:
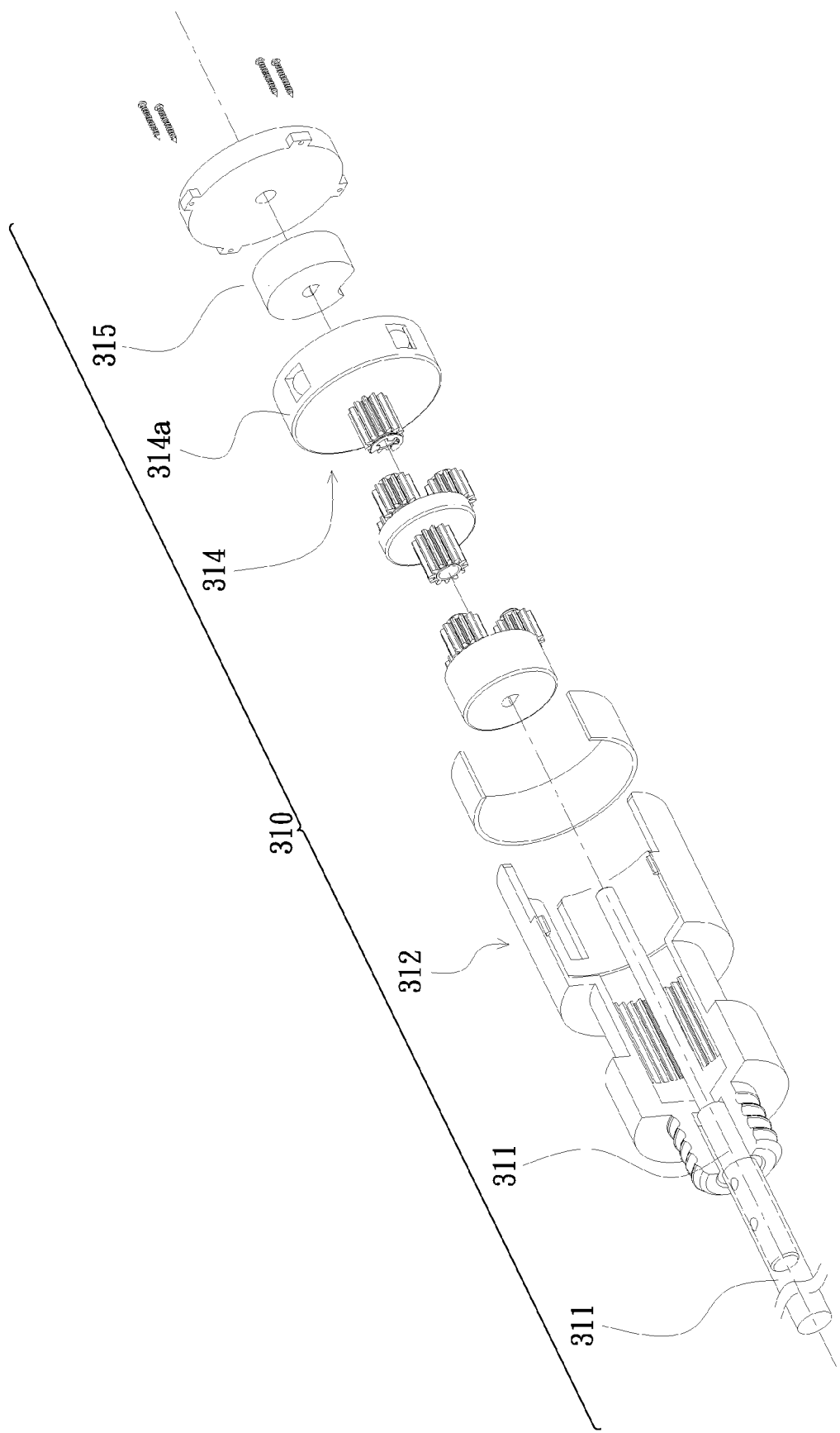
FIG. 8B is a schematic exploded view of the decelerating device in FIG. 8A.
Figure 8C:
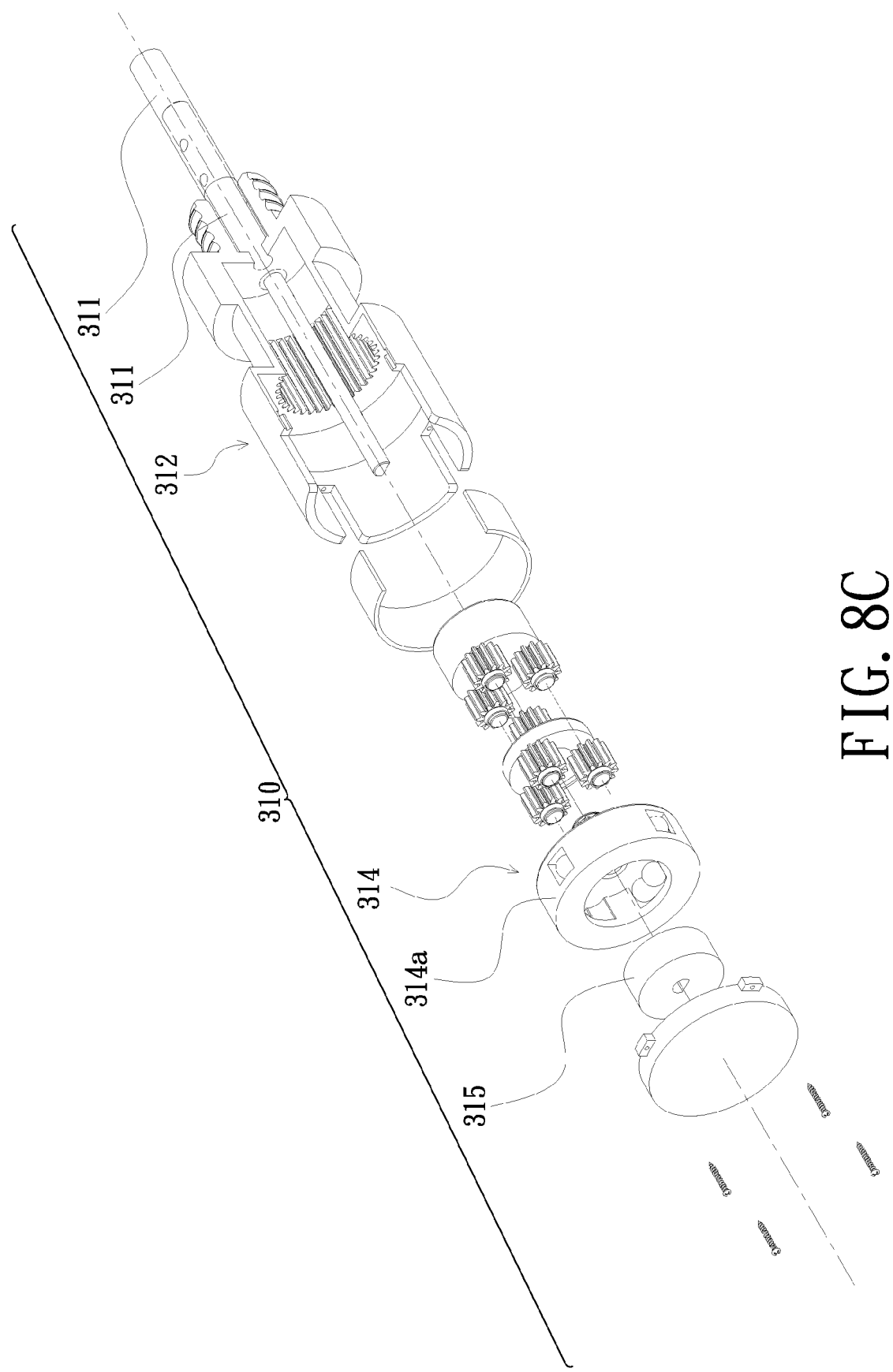
FIG. 8C is another schematic exploded view of the decelerating device in FIG. 8A.
Figure 9:
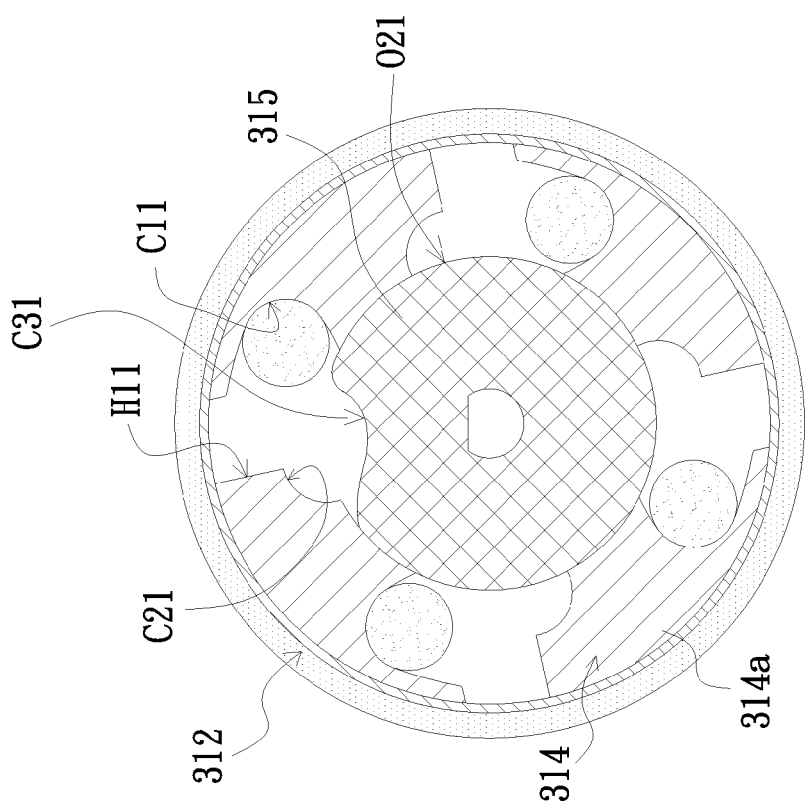
FIG. 9 is a schematic cross-sectional view of the decelerating device in FIG. 8A along the line III-III.

FIG. 8A is a schematic view of the decelerating device in the second embodiment of the present invention. FIG. 8B is a schematic exploded view of the decelerating device in FIG. 8A. FIG. 8C is another schematic exploded view of the decelerating device in FIG. 8A. FIG. 9 is a schematic cross-sectional view of the decelerating device in FIG. 8A along the line III-III.

Please referring to FIGS. 8A, 8B and 8C, the shape of a fixed element 315 of a decelerating device 310 is different from that of the fixed element 215 of the decelerating device 210 (see FIG. 2B). The outer ring 214d (see FIG. 2C) and the second balls 214e (see FIG. 2C) is removed from the decelerating device 310.

Please referring to FIGS. 8A, 8B, 8C and 9, the fixed element 315 of the decelerating device 310 is fixed at a fixed shaft 311 and located in a wheel 314a of a driven element 314. Each of the holes H11 has a first cavity C11 and a second cavity C21. The fixed element 315 has at least one third cavity C31 (one third cavity C31 is schematically shown in FIG. 9). The third cavity C31 is located at the outer surface O21 of the fixed element 315 facing the tube 312.

Figure 10:
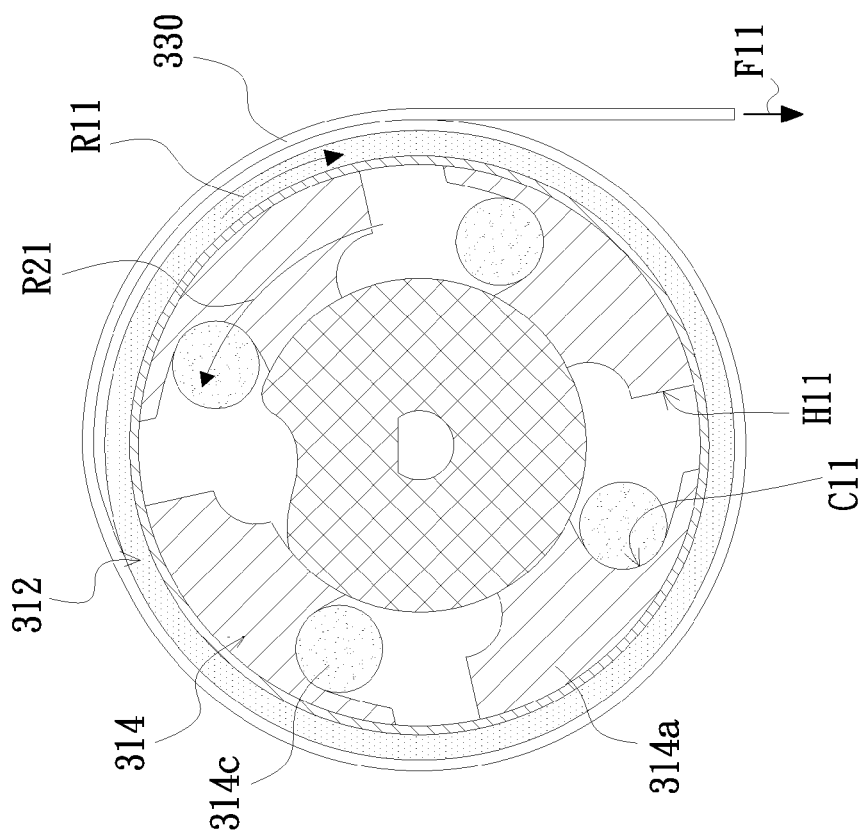
FIG. 10 is a schematic cross-sectional view of the projection screen in the second embodiment which is pulled to drive the decelerating device.
Figure 12:
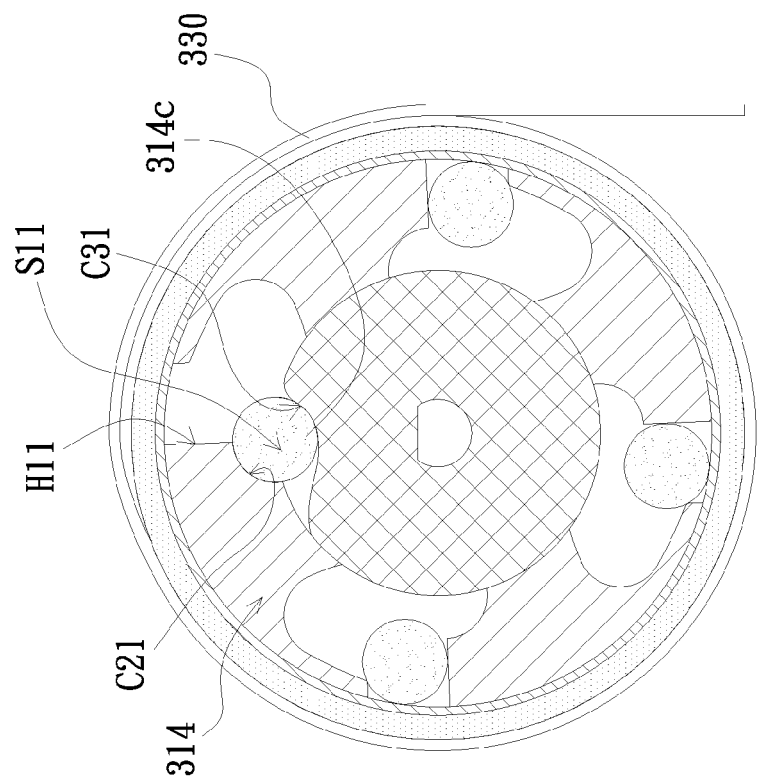
FIG. 12 is a schematic cross-sectional view of the decelerating device in the second embodiment which is self-locking.
Figure 11:
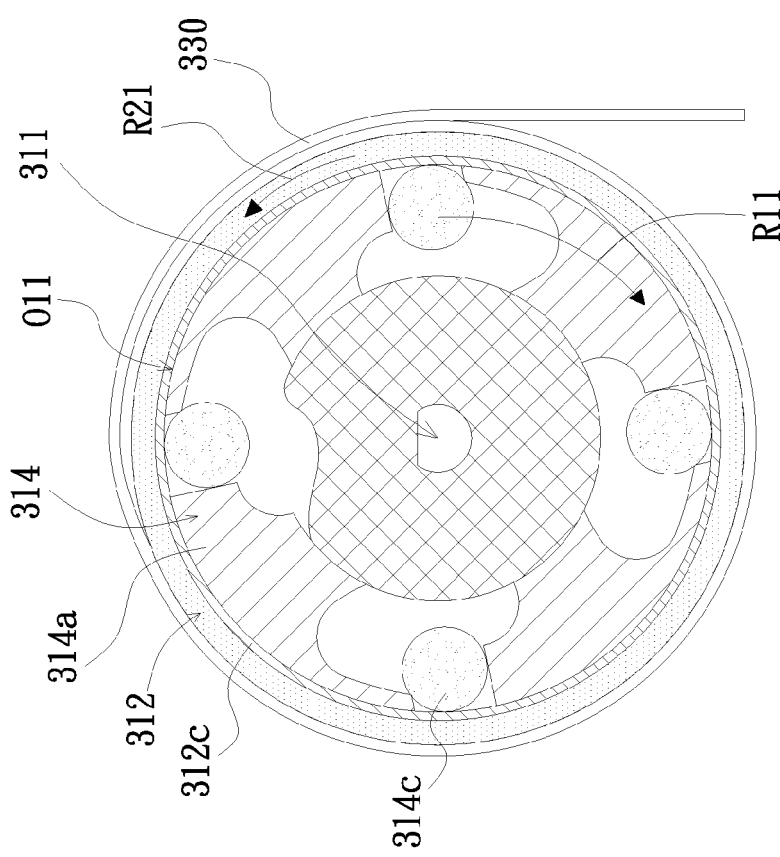
FIG. 11 is a schematic cross-sectional view of the projection screen in the second embodiment which is rolled up.

The operation process of the projection screen rolling mechanism having the decelerating device 310 in the present embodiment is described below. FIG. 10 is a schematic cross-sectional view of the projection screen in the present embodiment which is pulled to drive the decelerating device. FIG. 11 is a schematic cross-sectional view of the projection screen in the present embodiment which is rolled up. FIG. 12 is a schematic cross-sectional view of the decelerating device in the present embodiment which is self-locking.

Please referring to FIG. 10, when the projection screen 330 is affected by an external force F11 to be pulled such that the tube 312 rotates along a first rotational direction R11, the torsional spring (not shown) deforms elastically, the driven element 314 rotates along a second rotational direction R21 opposite to the first rotational direction R11 and each of the first balls 314c is located in the first cavity C11 of the corresponding hole H11.

Please referring to FIG. 11, when the tube 312 affected by the recovering force of the torsional spring (not shown) rotates above a specific rotational speed along the second rotational direction R21, the projection screen 330 rolls around the fixed shaft 311, the driven element 314 rotates along the first rotational direction R11 and each of the first balls 314c affected by a centrifugal force is exposed outside the outer surface O11 of the wheel 314a and rubs against the sound-attenuating ring 312c of the tube 312 such that the rotational speed of the tube 312 is reduced.

Please referring to FIG. 12, when the third cavity C31 and the second cavity C21 of one of the holes H11 together form an accommodating space S11 and one of the first balls 314c is located at the accommodating space S11, the first ball 314c at the accommodating space S11 restricts the rotation of the driven element 314 along the first rotational direction R11 (see FIG. 11).

According to the mentioned above, the decelerating device and projection screen rolling mechanism in each of the embodiments of the present invention at least has one of the following advantages or other advantages:

1. When the tube rotates above the specific rotational speed along the second rotational direction, each of the first balls affected by the centrifugal force is exposed outside the outer surface of the wheel and rubs against the tube to decelerate the tube. Accordingly, the projection screen of the projection screen rolling mechanism including decelerating device in each of the present embodiments is not damaged in the rolling process.

2. When the tube rotates above the specific rotational speed along the second rotational direction, each of the first balls affected by the centrifugal force is exposed outside the outer surface of the wheel and rubs against the sound-attenuating ring of the tube. Accordingly, when the projection screen of the projection screen rolling mechanism including decelerating device in each of the present embodiments is in the rolling process, the noise generated is lower.

3. When the projection screen of projection screen rolling mechanism including the decelerating device in each of the present embodiments is not pulled or not rolled up to be brought to a stop, the tube stops rotating and the decelerating device is self-locking. Accordingly, the user may stop the projection screen from moving so as to locate the projection screen at an adequate position.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A decelerating device, comprising:
   a fixed shaft;
   a tube, disposed around the fixed shaft and adapted to rotate about the fixed shaft, wherein the tube has a plurality of internal teeth;
   a first transmission element, having a fixed portion fixed at the fixed shaft and at least one first planetary gear revolvably disposed at the fixed portion, wherein the internal teeth of the tube are geared to the first planetary gear; and
   a driven element, having a wheel, a first sun gear fixed at the wheel and a plurality of first balls, wherein the first sun gear and the wheel are revolvably disposed at the fixed shaft and in the tube, the first planetary gear is adapted to drive the first sun gear, the wheel has a plurality of holes, each of the holes extends from an outer surface of the wheel facing the tube to the interior of the wheel to form a first cavity, and the first balls are disposed in the holes respectively;
   when the tube rotates along a first rotational direction, the driven element rotates along a second rotational direction opposite to the first rotational direction and each of the first balls is located in the corresponding first cavity;

when the tube rotates above a specific rotational speed along the second rotational direction, the driven element rotates along the first rotational direction and each of the first balls is exposed outside the outer surface of the wheel and rubs against the tube.

2. The decelerating device according to claim 1, further comprising a fixed element fixed at the fixed shaft and located in the wheel, wherein each of the holes further has a second cavity, the fixed element has at least one third cavity, the third cavity is located at an outer surface of the fixed element facing the tube, and when the third cavity and the second cavity of one of the holes together form an accommodating space and one of the first balls is located at the accommodating space, the first ball at the accommodating space restricts the rotation of the driven element along the first rotational direction.

3. The decelerating device according to claim 2, further comprising a magnetic element disposed in the fixed element.

4. The decelerating device according to claim 1, further comprising a fixed element fixed at the fixed shaft, wherein the fixed element has a base and an inner ring disposed at the base, the driven element has an outer ring disposed at the wheel and a plurality of second balls, the outer ring has a plurality of dents, each of the dents is located at an inner surface of the outer ring and has a second cavity and a third cavity, the second balls are disposed at the dents respectively, the base is near the outer ring, the inner ring is located in the outer ring and has at least one fourth cavity, the fourth cavity is located at an outer surface of the inner ring, and the outer surface of the inner ring faces the inner surface of the outer ring and the tube;

when the tube rotates above the specific rotational speed along the second rotational direction, each of the second balls is located at the corresponding second cavity;

when the fourth cavity and the third cavity of one of the dents together form an accommodating space and one of the second balls is located at the accommodating space, the second ball at the accommodating space restricts the rotation of the driven element along the first rotational direction.

5. The decelerating device according to claim 4, further comprising a magnetic element disposed in the inner ring.

6. The decelerating device according to claim 1, wherein the tube further has a casing and a sound-attenuating ring, the internal teeth are located at an inner wall of the casing, the sound-attenuating ring is disposed on the inner wall and surrounds the outer surface of the wheel, and each of the first balls rubs against the sound-attenuating ring when the tube rotates above the specific rotational speed along the second rotational direction.

7. The decelerating device according to claim 6, wherein the sound-attenuating ring is composed of rubber.

8. The decelerating device according to claim 1, further comprising a second transmission element having a base, a second sun gear fixed at the base and at least one second planetary gear revolvably disposed at the base, wherein the second sun gear and the second planetary gear are located at two opposite sides of the base respectively, the second sun gear and the base are revolvably disposed at the fixed shaft, the first planetary gear is geared to the second sun gear, and the second planetary gear is geared to the first sun gear.

9. A projection screen rolling mechanism, comprising:
a decelerating device, comprising:
a fixed shaft ;
a tube, disposed around the fixed shaft and adapted to rotate about the fixed shaft, wherein the tube has a plurality of internal teeth;
a first transmission element having a fixed portion fixed at the fixed shaft and at least one first planetary gear revolvably disposed at the fixed portion, wherein the internal teeth of the tube are geared to the first planetary gear; and
a driven element having a wheel, a first sun gear fixed at the wheel and a plurality of first balls, wherein the first sun gear and the wheel are revolvably disposed at the fixed shaft and in the tube, the first planetary gear is adapted to drive the first sun gear, the wheel has a plurality of holes, each of the holes extends from an outer surface of the wheel facing the tube to the interior of the wheel to form a first cavity, and the first balls are disposed in the holes respectively;
a torsional spring, hitched to the fixed shaft, wherein one end of the torsional spring is connected to the tube and another end of the torsional spring is connected to the fixed shaft; and
a projection screen, wherein one side of the projection screen is connected to the tube and the projection screen is adapted to roll around the fixed shaft;
when the projection screen is pulled such that the tube rotates along a first rotational direction, the torsional spring deforms elastically, the driven element rotates along a second rotational direction opposite to the first rotational direction and each of the first balls is located in the corresponding first cavity;
when the tube affected by the recovering force of the torsional spring rotates above a specific rotational speed along the second rotational direction, the projection screen rolls around the fixed shaft, the driven element rotates along the first rotational direction and each of the first balls is exposed outside the outer surface of the wheel and rubs against the tube.

10. The projection screen rolling mechanism according to claim 9, wherein the decelerating device further comprises a fixed element fixed at the fixed shaft and located in the wheel, each of the holes further has a second cavity, the fixed element has at least one third cavity, the third cavity is located at an outer surface of the fixed element facing the tube, when the third cavity and the second cavity of one of the holes together form an accommodating space and one of the first balls is located at the accommodating space, the first ball at the accommodating space restricts the rotation of the driven element along the first rotational direction.

11. The projection screen rolling mechanism according to claim 10, wherein the decelerating device further comprises a magnetic element disposed in the fixed element.

12. The projection screen rolling mechanism according to claim 9, wherein the decelerating device further comprises a fixed element fixed at the fixed shaft, the fixed element has a base and an inner ring disposed at the base, the driven element has an outer ring disposed at the wheel and a plurality of second balls, the outer ring has a plurality of dents, each of the dents is located at an inner surface of the outer ring and has a second cavity and a third cavity, the second balls are disposed at the dents respectively, the base is near the outer ring, the inner ring is located in the outer ring and has at least one fourth cavity, the fourth cavity is located at an outer surface of the inner ring, and the outer surface of the inner ring faces the inner surface of the outer ring and the tube;

when the tube rotates above the specific rotational speed along the second rotational direction, each of the second balls is located at the corresponding second cavity;

when the fourth cavity and the third cavity of one of the dents together form an accommodating space and one of the second balls is located at the accommodating space, the second ball at the accommodating space restricts the rotation of the driven element along the first rotational direction.

13. The projection screen rolling mechanism according to claim 12, wherein the decelerating device further comprises a magnetic element disposed in the inner ring.

14. The projection screen rolling mechanism according to claim 9, wherein the tube further has a casing and a sound-attenuating ring, the internal teeth are located at an inner wall of the casing, the sound-attenuating ring is disposed on the inner wall and surrounds the outer surface of the wheel, and each of the first balls rubs against the sound-attenuating ring when the tube rotates above the specific rotational speed along the second rotational direction.

15. The projection screen rolling mechanism according to claim 14, wherein the sound-attenuating ring is composed of rubber.

16. The projection screen rolling mechanism according to claim 9, wherein the decelerating device further comprises a second transmission element having a base, a second sun gear fixed at the base and at least one second planetary gear revolvably disposed at the base, the second sun gear and the second planetary gear are located at two opposite sides of the base respectively, the second sun gear and the base are revolvably disposed at the fixed shaft, the first planetary gear is geared to the second sun gear, and the second planetary gear is geared to the first sun gear.

* * * * *